Sept. 11, 1934.  W. A. READY  1,973,101
AGRICULTURAL IMPLEMENT AND THE METHOD OF MARKING THE SAME
Filed Jan. 30, 1932   3 Sheets-Sheet 1
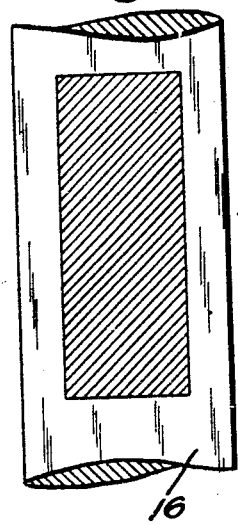
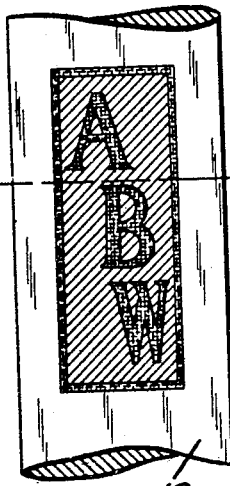
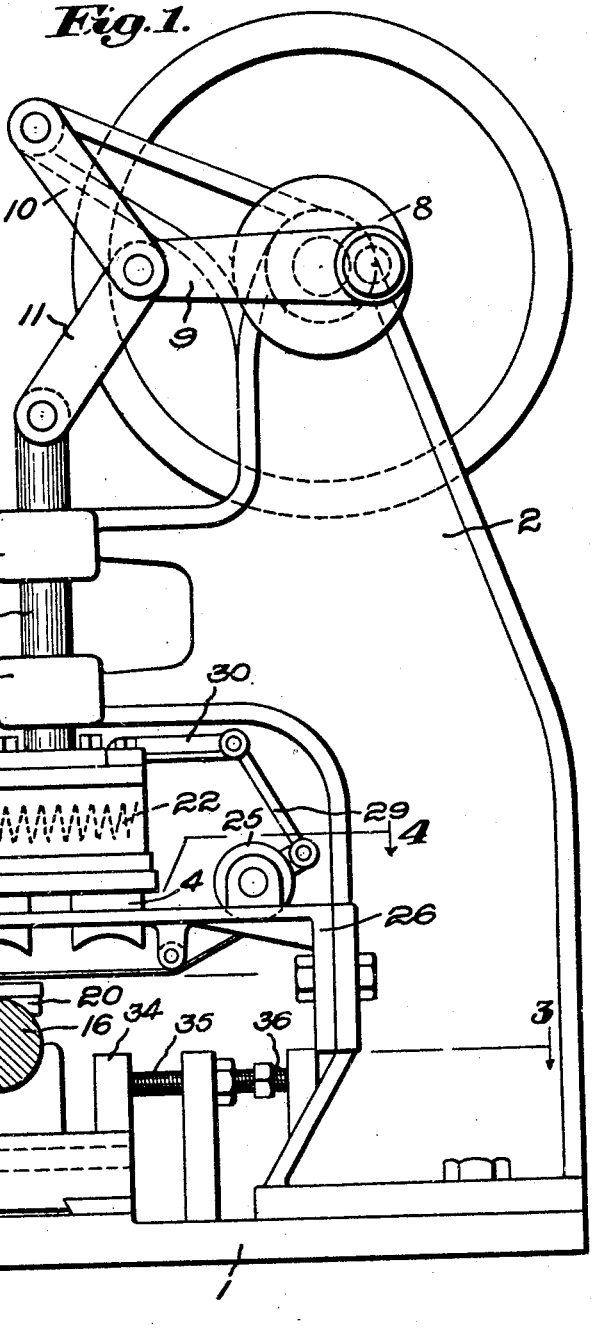
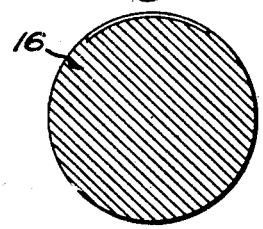
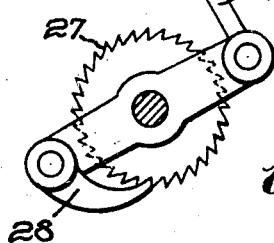
Inventor:
William A. Ready
Attys.

Sept. 11, 1934.  W. A. READY  1,973,101
AGRICULTURAL IMPLEMENT AND THE METHOD OF MARKING THE SAME
Filed Jan. 30, 1932  3 Sheets-Sheet 2

Inventor:
William A. Ready.
by Emery Booth Varney & Townsen
Attys

Sept. 11, 1934.  W. A. READY  1,973,101
AGRICULTURAL IMPLEMENT AND THE METHOD OF MARKING THE SAME
Filed Jan. 30, 1932    3 Sheets-Sheet 3
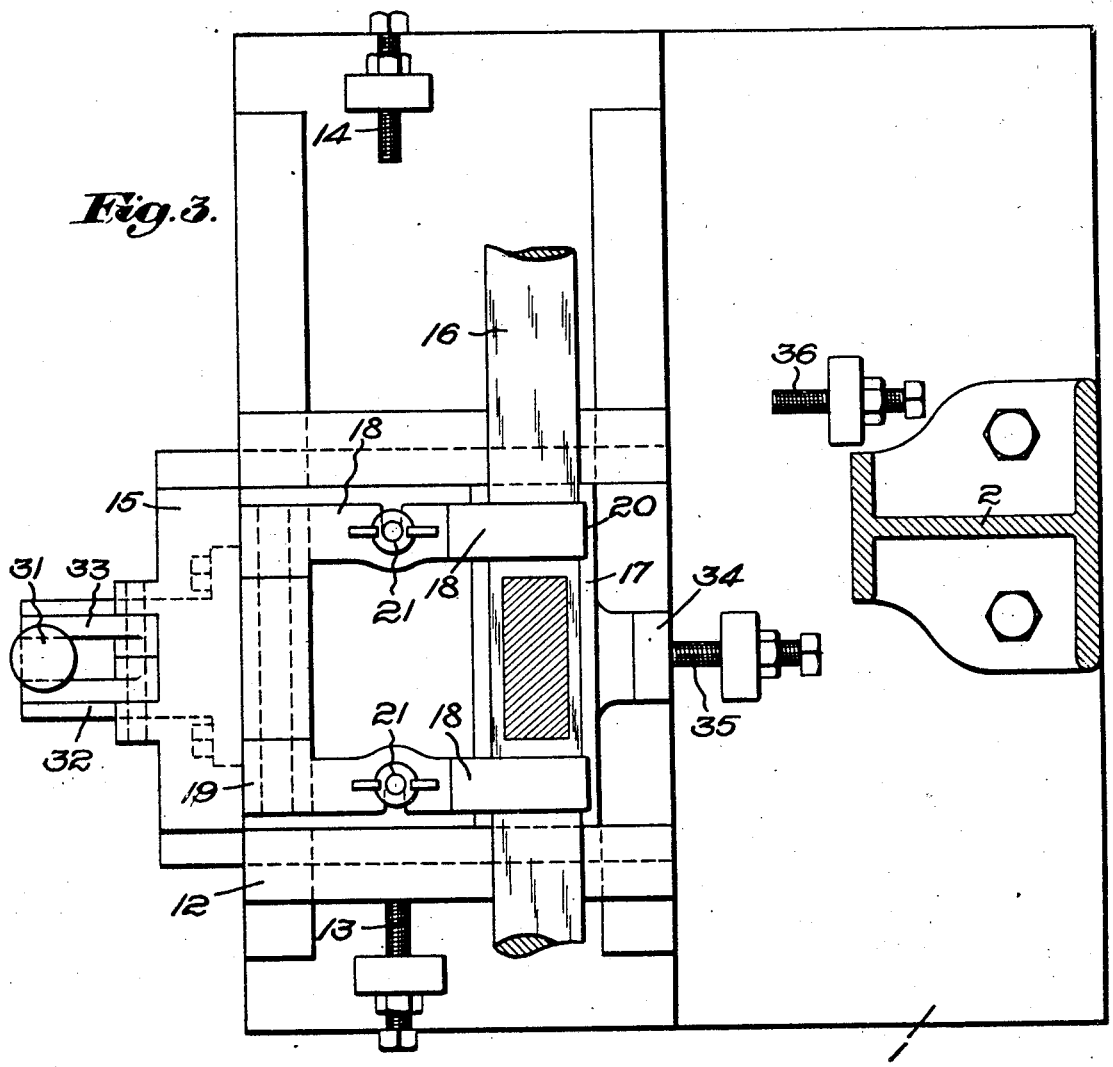
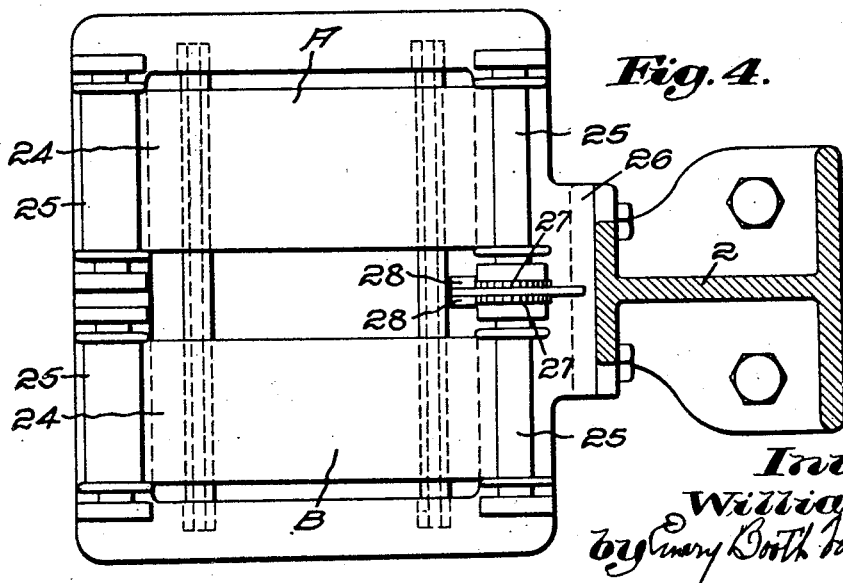
Inventor:
William A. Ready Patented Sept. 11, 1934

1,973,101

UNITED STATES PATENT OFFICE 1,973,101

AGRICULTURAL IMPLEMENT AND THE METHOD OF MARKING THE SAME

William A. Ready, Brookline, Mass., assignor to Ames Baldwin Wyoming Co., Parkersburg, W. Va., a corporation of Delaware Application January 30, 1932, Serial No. 589,951

3 Claims. (Cl. 41—33)

My invention aims to provide improvements in agricultural implements and the method of marking the same.

In the drawings which illustrate a preferred embodiment of my invention:—

Figure 1 is a side elevation of the upper portion of a machine for practicing my improved method of marking handles of agricultural implements;

Fig. 3 is a plan section taken on the line 3—3 of Fig. 1 showing the handle clamping and sliding mechanism;

Fig. 4 is a plan section taken on the line 4—4 of Fig. 1 and showing the mechanism for applying the marking to the handle;

Fig. 5 is a plan view of a portion of a handle showing the first color impression of the marking;

Fig. 6 is a plan view of a portion of the handle showing the completed mark;

Fig. 7 is a section taken on the line 7—7 of Fig. 6 to illustrate the manner in which the mark is countersunk into the handle; and Fig. 8 is a ratchet construction for feeding the ribbons.

Figure 2:
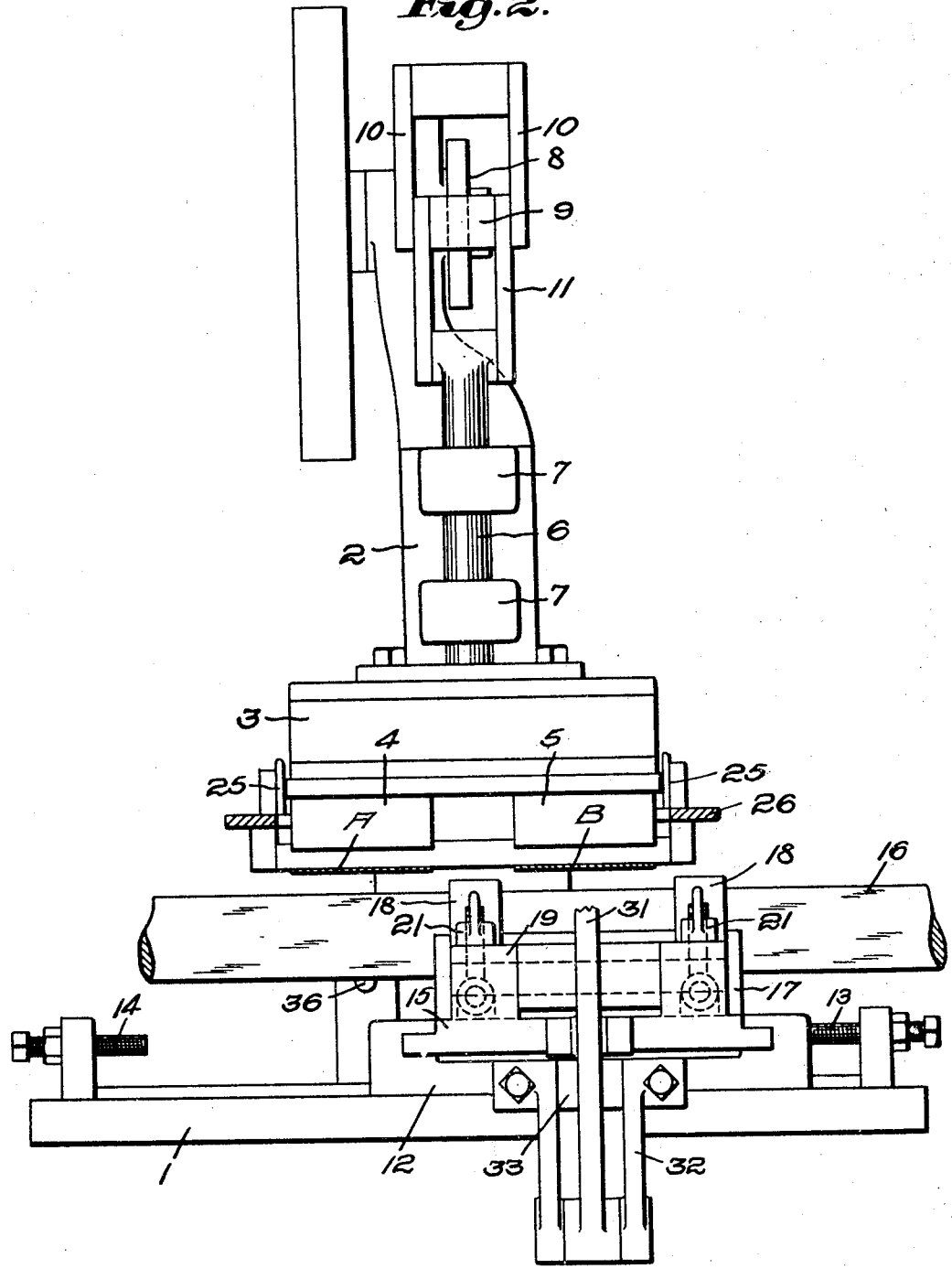
Fig. 2 is a front elevation of that portion of the machine shown in Figure 1, a part of the slide operating handle being broken away.

Referring now to the drawings I have illustrated in Figs. 5, 6 and 7 a method of applying marks, particularly trade-marks, directly to the wooden handles of agricultural and like implements, thereby eliminating the usual pasted on label. I have also illustrated in the other figures of the drawings one form of mechanism by which the method of my invention may be practiced.

Heretofore trade-marks having various colored designs have been applied to the handles of shovels and the like in the form of a paper label wrapped about and pasted to the handle. Since most handles have been sanded and waxed their surfaces were exceedingly smooth and it has been almost impossible to secure a glue or paste which will satisfactorily hold the label in place. Therefore, before the shovels and like implements have reached the ultimate users many labels have been lost and the effect of the identification mark very greatly reduced. Even if the labels do remain attached they soon become worn and torn so that they are not recognizable.

I have overcome the disadvantages of the use of labels for identification by applying the identification mark in two or more colors directly to the handle, as indicated in Figs. 5, 6 and 7. The mark is preferably applied by application of each color in a predetermined design as a separate operation. Furthermore I prefer to impress the mark into the material of the handle so that it is slightly countersunk (Fig. 7), thereby substantially permanently guarding the identification mark against obliteration. The method of applying identification marks in various colors in accordance with my invention comprises applying a pigment in one color and in a predetermined design and then applying one or more other colored pigments in predetermined designs by any suitable mechanism which will accomplish the desired results. Since the method of marking and the resulting improved handles form the subject matter of my present invention, the mechanism for practicing my invention is shown only in sufficient detail to enable those skilled in the art to understand it. I therefore reserve my rights to file an application or applications covering any patentable novelty with respect to a machine for practicing my invention which may be disclosed in the present application.

In the drawings I have shown and will now describe one mechanism which may be used to practice my improved method and produce implement handles marked in an improved manner. The mechanism illustrated comprises a bed plate 1 supporting a standard 2 which carries a reciprocable head 3 at the under side of which are located two or more dies, as best illustrated in Figs. 1 and 2. In the particular structure illustrated, I have shown two dies 4 and 5 each of which is provided with a predetermined design for producing a desired marking hereinafter more fully described. The reciprocable head 3 is attached to a rod 6 mounted in bearings 7 and is movable by means of a crank 8 acting through links 9, 10 and 11 and driven in any suitable manner, as best illustrated in Figure 1. I have also mounted upon the bed plate 1 a slide plate 12 movable in opposite directions beneath the die members 4 and 5. The distance which the slide plate 12 may move in one direction is regulated by the adjusting screw 13 (Figs. 2 and 4) and in the opposite direction by the adjusting screw 14. Carried by the slide plate 12 is another slide plate 15 which supports clamping means for holding the implement handle 16 in position. This slide member 15 is adapted to move transversely to the line of movement of the slide plate 12. The handle-clamping means illustrated (Figs. 1 and 3) comprises a block 17 of substanial length and grooved to form a jaw for receiving the handle and also a pair of clamping members 18—18 pivoted at one end to the brackets 19 carried by the slide 15 and having jaws 20 at their other end adapted to cooperate with the jaw of the block 16 securely to clamp the handle 16 in position. The clamping means is provided by set screws 21—21 (Figs. 1 and 3) pivoted to the slide member 15 so that they may be quickly and easily swung out of the way to permit the clamping members 18—18 to be swung out of engagement with the handle 16.

The reciprocable head 3 is provided with a resistance coil 22 connected by suitable wires 23 to a source of electrical supply, thereby to provide means for heating the die members 4 and 5. These die members are heated so that when they press a pigment-carrying ribbon 24 against the handle 16 the dry pigment carried by the ribbon will be transferred to the handle. In the structure illustrated there are two ribbons 24 (Figs. 2 and 4) one for each of the dies 4 and 5 and each ribbon carries a different colored pigment. These ribbons are carried by rolls 25 supported on a bracket 26 carried by the standard 2. The ribbons pass from one roll 25 to another roll 25 in a path beneath one of the die members carried by the head 3 thereby to be interposed between the die member and the handle 16. A rachet 27 (Fig. 4) is associated with each of the rolls 25 nearest the standard 2 and both ratchets are operated by a single pawl 28. The pawl is attached to an arm 29 which is moved in a ratchet-operating direction by the member 30 projecting from the head 3 during each upward movement of the die member. In this manner the pigment-carrying ribbons are moved proper distances during each cycle of operation of the mechanism to present an unused portion of the ribbon for pressure against the handle 16.

In practicing my improved method of marking shovel handles and the like with the mechanism illustrated and described the operation is as follows: First, the electricity is turned on in the resistance unit 22 to heat the dies 4 and 5. Any suitable means for controlling the degree to which the dies may be heated may be used. Then a shovel handle is placed in the block 17 and clamped in position by the clamping members 18, as best illustrated in Figs. 1, 2 and 3. By means of the handle 31 (Fig. 1) which is pivoted to a bracket 32 carried by the slide plate 12 and connected by a link 33 to the slide 15 those slide members may be adjusted so that they assume the positions shown in Figs. 1 and 2. With the slide members 12 and 15 thus arranged the handle is located in a proper position for the die 4 to make an impression in the handle 16 between the clamping members 18—18, as best illustrated in Fig. 2. The mechanism for operating the head 3 is then suitably operated to depress the die member 4 against the pigment-carrying ribbon A which is forced downwardly against the handle 16. During this operation the pigment which may be in a dry state carried by some sort of a wax substance is transferred from the ribbon to the handle 16 in the design presented by the die 4. The heat of the die melts the wax which adheres to the handle 16 and dries relatively quickly when the die member is returned to the position shown in Figure 1. Therefore, since the wax carries the colored pigment a suitable design is impressed upon the handle, as shown in Fig. 5. In this instance there is shown a solid block of color which forms the background of the marking. Thereafter the slide plate 12 is moved along the bed plate 1 by means of the handle 31 until it engages the set screw 14. Then the operator pushes inwardly upon the handle 31 to move the slide 15 into a position where the lug 34 engages the set screw 35 illustrated in Fig. 3. In the previous position of the slide 15 the lug 34 was engaged with the set screw 36 which provides for accurate positioning of the handle beneath the die member 4. When the slide members are shifted as just described the set screws 14 and 35 will position them properly with respect to the die member 5. Then the driving mechanism for depressing the head 3 is again operated so that the ribbon B will be pressed against the handle 16 and another colored pigment transferred and superposed upon the background to contrast therewith and provide the lettering and the framing, as illustrated in Fig. 6. It will be understood that the same general mechanism can be carried further to apply one or more other colors in desired designs in the same manner as already described.

My invention is particularly useful in connection with the application of trade-marks to agricultural instruments and the like because the marks on that type of implement are subjected to serious abuse. It is therefore desirable to apply identification marks in such a manner that they will be as lasting as possible. This end is accomplished by applicant's method and the resulting marks are surprisingly clear and satisfactory.

While I have illustrated and described a preferred embodiment of my invention I do not wish to be limited thereby, because the scope of my invention is best defined by the following claims.

I claim:

1. A cylindrical wooden tool handle having an area of the cylindrical surface thereof depressed to provide a medallion, the depressed area having a coloring applied thereto and an inscription of contrasting color imprinted on the medallion.

2. The method of marking a waxed tool handle which comprises forcing coloring material into the grain of the wood over a limited area to provide a medallion and imprinting an inscription of contrasting color on said medallion.

3. The method of marking a waxed tool handle which comprises applying a transfer leaf thereto, impressing said leaf with a hot die to transfer a medallion-like field to the tool handle and similarly transferring on said field an inscription in contrasting color.

WILLIAM A. READY.